United States Patent [19]

Burns

[11] Patent Number: 5,587,065
[45] Date of Patent: Dec. 24, 1996

[54] MOBILE SYSTEM FOR THE COLLECTION, SEPARATION AND DISPOSAL OF WET SOLID, OILY AND/OR WATERY WASTE

[75] Inventor: Thomas J. Burns, Aurora, Ohio

[73] Assignee: H2Oil, Inc., Aurora, Ohio

[21] Appl. No.: 35,626

[22] Filed: Mar. 23, 1993

[51] Int. Cl.$^6$ ............................. B01D 21/24; B01D 21/34
[52] U.S. Cl. ......................... 210/104; 210/110; 210/117; 210/259; 210/261; 210/519; 210/521
[58] Field of Search ............................. 210/86, 96.1, 110, 210/117, 241, 257.1, 258, 260, 259, 261, 497.01, 519, 521, 522, 538, 539, 540, 804, 104, 406, 416.1; 166/267

[56] References Cited

U.S. PATENT DOCUMENTS

| | | | |
|---|---|---|---|
| 2,620,043 | 12/1952 | Williams | 210/521 |
| 2,751,998 | 6/1956 | Glasgow | 210/521 |
| 3,933,654 | 1/1976 | Middelbeek | 210/521 |
| 4,042,512 | 8/1977 | McCarthy et al. | 210/519 |
| 4,048,070 | 9/1977 | Propp | 210/85 |
| 4,110,215 | 8/1978 | Bramlett | 210/114 |
| 4,149,973 | 4/1979 | Harris | 210/521 |
| 4,238,333 | 12/1980 | Tidwell | 210/800 |
| 4,385,986 | 5/1983 | Jaisinghani et al. | 210/521 |
| 4,396,504 | 8/1983 | Tannehill | 210/86 |
| 4,623,452 | 11/1986 | Petersen | 210/104 |
| 4,722,800 | 2/1988 | Aymong | 210/521 |

FOREIGN PATENT DOCUMENTS

| | | | |
|---|---|---|---|
| 2396576 | 2/1979 | France | 210/521 |

*Primary Examiner*—Joseph W. Drodge
*Attorney, Agent, or Firm*—Schweitzer Cornman & Gross

[57] ABSTRACT

A system is provided for handling of watery, oily waste which constitutes a closed vessel divided into two chambers by a dividing wall, such that lower chamber portions are in fluid communication. The vessel contains an inlet for flowing fluid into the upper portion of one chamber, an upper outlet for the other chamber, an air passage connecting upper portions of the chambers and effective for maintaining normal liquid levels in the two chambers, a sensing device in the one chamber and a discharge conduit for the first chamber which is controlled selectively by the sensing device.

19 Claims, 3 Drawing Sheets

MOBILE SYSTEM FOR THE COLLECTION, SEPARATION AND DISPOSAL OF WET SOLID, OILY AND/OR WATERY WASTE

BACKGROUND AND SUMMARY OF THE INVENTION

The invention is directed to the mobile collection, processing and disposal of waste liquids containing oily components, solids, and other contaminants. It is particularly useful for, but by no means limited to, the clean up of oily, watery waste liquid from washing operations and the like.

In one of the known systems for handling waste liquids from washing operations, a wash pad, typically of concrete, is constructed over a large (e.g., 1000 gallon) surge tank equipped with an oil/grease trap. Waste water, collected by the wash pad, is drained into the surge tank, where there is an opportunity for solids to settle and the oily fractions to float to the top. After a sufficient waiting period, the collected waste liquid is pumped out and directed to a separating system, where the oily materials can be removed and the processed water reused or discharged. This system, while functionally satisfactory, requires that machinery to be cleaned be transported to the cleaning area. It is not feasible for situations requiring the cleaning equipment to be brought to the site of the machinery.

Where cleaning is to be done at the site of the machinery, without benefit of a pre-existing wash pad, mobile clean up equipment is required, in order to avoid hazardous or contaminating spills into the ground and/or sewer systems, or into local streams and rivers. Typically, such spills are tightly regulated, and violations can bring costly and serious penalties.

Conventional mobile clean up systems typically involve a large capacity tank truck, capable of vacuuming up the entire quantity of waste liquid and transporting the liquid back to a stationary treatment plant for processing and disposal in a regulated manner. This approach has serious shortcomings, however. Among these is that the entire body of waste liquid is removed and transported off site, which can constitute the processor as both a generator and a transporter of waste liquid with permanent responsibility for the hazardous waste. Another shortcoming is that the mobile equipment typically has to be quite large, with a capacity of several thousand gallons, which is much larger than the typical volume of waste liquid required to be processed. This results in significant capital cost, as well as additional costs of maintaining a large and costly piece of equipment.

In accordance with the present invention, a novel and improved mobile recovery and processing system is provided, which is small and relatively inexpensive, which can be transported to the clean up site by a small, lightweight trailer or other vehicle, and which not only collects but also processes the waste liquid on site. Any materials classified as hazardous can be containerized and retained at the site at which they are generated, which greatly simplifies compliance with the various regulations relating to such materials and, correspondingly, reduces the costs involved in the clean up operations.

In a particularly preferred form of the invention, a portable processing system is comprised of four vessels, which may comprise ordinary, commercially available, open-topped steel drums. Three of the vessels are connected in series and typically activated by a vacuum source connected to the last vessel of the series. When the vacuum pump is activated, waste liquid is drawn into the first vessel, where it is settled and strained to eliminate solid materials, such as trash, dirt and the like. The waste liquid, substantially free of its solids content, then flows to the second vessel, which forms a significant part of the system and serves in a novel and efficient manner to separate oily constituents from the waste water. Processed water, substantially free of oily constituents, then flows from the second vessel into the third receptacle, where it is collected for re-use or disposal by the available sanitary system.

Pursuant to the invention, the second vessel or separator vessel incorporates first and second fluid chambers, advantageously in the form of a housing divided by a vertical wall. The housing can be mounted atop a drum-like receptacle into which the dividing wall projects. Oily waste water enters the first fluid chamber, where the oily components are retained, and processed water exits from the second chamber. The two chambers are in communication in their upper and lower portions, and an outlet for the second chamber establishes a normal liquid level for both chambers, located below the level of the upper communication but well above the level of the lower communication. Oily waste water enters the first chamber near the top and is baffled and caused to flow gently into a body of collected liquid. While in the first chamber, oil separates from the water, with the water ultimately flowing downward, under the dividing wall and then upward into the second fluid chamber. Periodically, when a sufficient layer of oily material has collected in the upper portion of the first chamber, it is drawn off and accumulated in a fourth, oil-receiving vessel. The separated oily materials can then be reprocessed in a suitable manner.

The system of the invention, while capable of being constructed of readily available, largely standardized and inexpensive components, it is adaptable to highly automatic operation, so that minimum operator attendance and attention is required.

Although the system of the invention is ideally adapted for trailer-mounted mobile utilization, it is sufficiently economical to be attractive as a fixed processing installation, as well where oily/watery waste materials are regularly experienced.

For a more complete understanding of the above and other features and advantages of the invention, reference should be made to the following detailed disclosure of preferred embodiments and to the accompanying drawings.

DESCRIPTION OF PREFERRED EMBODIMENTS OF THE INVENTION

Figure 1:
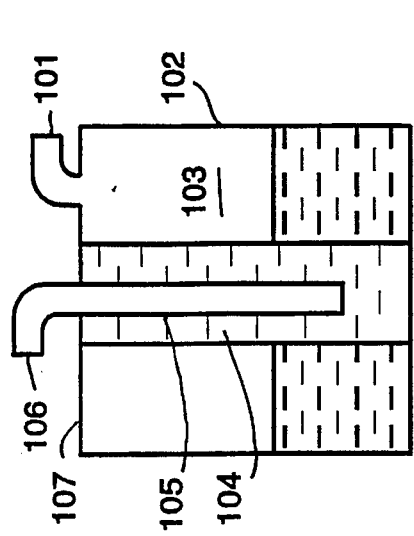
FIG. 1 is a simplified cross sectional representation of a waste-water-receiving vessel employed as the first vessel in the new processing system, for receiving waste liquid from the clean up site, which liquid may include trash and other solids.

Referring now to the drawing, FIG. 1 illustrates a waste water vessel 103 for receiving waste water for processing. The waste water vessel advantageously includes an open top drum 102, which may be of a standard commercially available type provided with a lid (not shown) which can be secured to the top to seal the container. In the system of the invention, a specially constructed lid 107 is provided which includes a waste water inlet fitting 101 communicating with the interior of the vessel. An outlet pipe 105 is also mounted on the lid 107 and extends vertically downward into the receptacle, to a point slightly above the bottom wall 108 of the drum. An outlet fitting 106 is provided at the upper end of the outlet pipe 105, as shown.

Also mounted on the removable lid 107 is a tubular member 104 which surrounds the outlet pipe 105 and extends to the bottom wall 108 of the drum 102. The tubular member 104 preferably is closed at the bottom, and is perforated over its entire surface to serve as a strainer for trash and large solid materials. As will be further explained, when the system is in operation, waste water flows into the vessel 103 through the inlet fitting 101, is strained through the perforations of the tubular member 104 and, free of trash and settled-out particles, flows upward through the outlet pipe 105 and exits through the outlet fitting 106.

Typically and advantageously, though not necessarily, the system is operated by suction at the upstream end. Accordingly, the tubular member 104 serves not only as a strainer, but also in the additional capacity as a support between the bottom 108 of the drum and its lid 107 to support the bottom and the lid against the pressure differential resulting from evacuating the interior of the receptacle.

As will be evident in FIG. 1, all of the functioning elements of the waste water vessel 103 are mounted on and are removable with the lid 107. When the system is in operation, the lid is applied to the top of the receptacle and sealed thereto in a conventional manner by clamping rings or other means (not shown).

Figure 2:
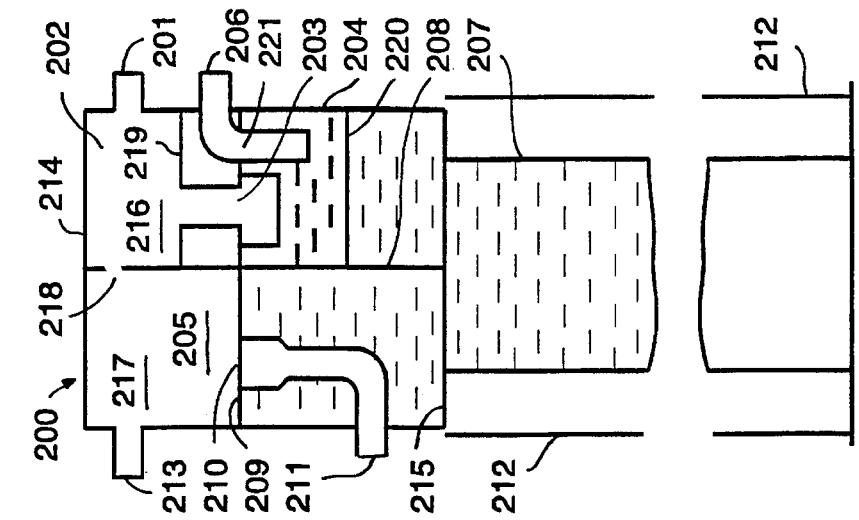
FIG. 2 is a simplified cross sectional representation of a separator vessel employed in the new system and constituting an important feature thereof for effecting the separation of oily components from the stream of waste liquid.

With reference to FIG. 2 of the drawing, there is illustrated a particularly advantageous form of separating vessel 205 according to the invention. To advantage, the separating vessel includes an upper housing 200, which is arranged to be seated on top of a receptacle 207, which may be a conventional open top drum or similar container, much like the receptacle 102 of FIG. 1. In the illustrated arrangement, the main housing 200 is sealingly secured to the top of the receptacle 207 by a plurality of threaded tie rods 212.

In the illustrated form of the invention, the housing 200 is divided by means of a vertical wall 208 which extends from the top wall 214 of the housing preferably to a point below its bottom wall, designated by the numeral 215, so as to extend part way down into the open top receptacle 207. The vertical wall 208 divides the housing 200 into first and second fluid chambers 216, 217 respectively. These two chambers are isolated from each other over most of their height. The bottom of each chamber, however, opens directly into the upper portion of the open top receptacle 207, so that the two fluid chambers communicate with each other at the bottom, below the lower extremity of the dividing wall 208. In addition, the two chambers communicate with each other at the top, through an opening 218 provided in the upper portion of the dividing wall 208.

An outlet pipe 211 enters the second fluid chamber 217 and has an open end 210 located below the communication opening 218 and well above the lower end of the dividing wall 208. The outlet opening 210, as will appear, defines a normal liquid level 209 for both of the fluid chambers 216, 217.

In the illustrated arrangement, the fluid chamber 216 is provided with an inlet 201 and its upper portion 202, for receiving strained waste water from the vessel 103 of FIG. 1. To particular advantage, the fluid chamber 216 is provided with a horizontal baffle 219, located at a level above the normal liquid level 209. A conduit, advantageously an inverted Tee fitting 203, communicates from the upper area 202 of the first fluid chamber to a level at, slightly above or slightly below the normal liquid level 209 of the chamber. Accordingly, waste water, which may enter the fluid chamber 216 with considerable velocity and agitation, under the action of the vacuum system, is allowed to flow gently by gravity through the fitting 203 and into the collected body of liquid into the chamber 216. Desirably, the discharge of the inverted Tee fitting 203 is near the normal liquid level 209 in the chamber, so that the incoming liquid flows directly into an accumulating oily layer 204, which facilitates separation of the oily and watery fractions of the waste liquid. The separated oil layer 204, being of lower specific gravity than water, floats on a supporting water layer 220. When the oily layer 204 is sufficiently deep, it is drawn off through an oil outlet fitting 206, which preferably enters the fluid chamber 216 from a point above the normal liquid level 209 and has its intake opening 221 a short distance below the liquid level.

The second fluid chamber 217 may be provided with a suction connection (or pressure vent) 213 for certain configurations of the system. More typically, however, the suction connection (or pressure vent) is accomplished via the outlet fitting 211.

Figure 3:
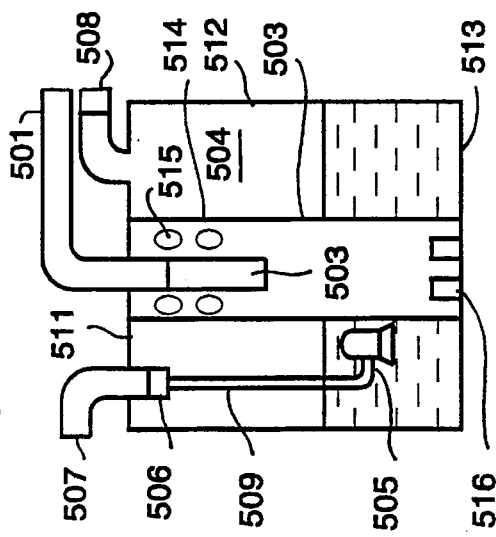
FIG. 3 is a simplified cross sectional representation of a processed water vessel for receiving processed water from the separator vessel of FIG. 2.

FIG. 3 illustrates a vessel 504 for receiving processed water from the second fluid chamber 217 of the separator 205. The vessel 504 advantageously comprises an open-topped drum-like receptacle 512 of conventional type. A fabricated custom lid 511 is arranged to be secured in sealed relation to the top of the receptacle 512 by suitable clamping or other means (not shown). In the illustrated arrangement, the lid mounts a fitting 508 adapted for connection to a source of vacuum. An inlet fitting 501 for processed water is also mounted on the lid 511 and connects with a discharge pipe 503 discharging processed water in the lower portion of the receptacle. A structural member 502 is mounted on the lid 511 and extends to the bottom wall 513 of the receptacle 512 to provide support when the vessel is evacuated. In the illustrated arrangement, the structural member 502 is in the form of a tube surrounding the processed water discharge pipe 503. The structural tube 502 is provided in its upper portion with a plurality of openings 515 for the passage of air from the inside of the tube to the vacuum connection 508. The tube also has openings 516 in its lower most portions to allow the free passage of water from the tube into the interior of the receptacle.

A discharge pump 505 is suitably mounted on the structural member 502, spaced above the bottom wall 513. Desirably, the pump 505 is self-actuated when the water level in the vessel reaches a predetermined level 510 to pump water through a discharge tube 509 and lid-mounted outlet fitting 507. The processed water can be reused or discharged in the sanitary system, as desired. Since the interior of the vessel 504 is under reduced pressure when the system is in operation, a check valve 506 is installed in the discharge tube 509 to prevent backflow of water or air when the pump 505 is not functioning. Desirably, the discharge tube 503 has its terminal end located at a level below the air openings 515 and above the level 510 of the retained water. This assures that the discharging air is not impeded by the collected water and, at the same time, effectively prevents discharging water from being drawn into the vacuum fitting 508.

Figure 4:
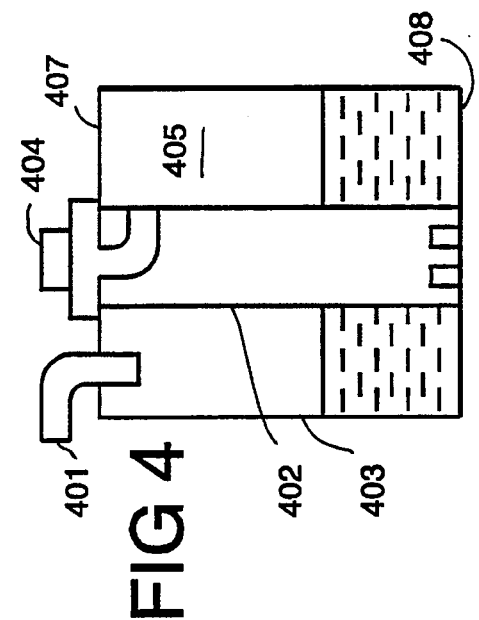
FIG. 4 is a simplified cross sectional representation of a vessel for receiving oily components separated in the vessel of FIG. 2.

FIG. 4 illustrates a typical form of vessel for receiving separated oil from the first fluid chamber 16 of the separator vessel. To advantage, the oil-receiving vessel 405 comprises an open-topped drum 403 of conventional, commercially available type. The vessel is provided with a lid 407, which is adapted to be secured in sealed relation to the open-top of the drum 403 by suitable clamping means or the like (not shown). The lid 407 mounts an inlet fitting 401, discharging into the interior of the vessel, and also a vacuum pump 404, also communicating with the interior of the vessel. A structural support 402, usually in the form of a length of tubing, is mounted on the lid 407 and extends to the bottom wall 408 of the container to provide support when the interior of the vessel is evacuated. When separated oil is extracted from the fluid chamber 216, it discharges into the vessel and is retained therein for eventual reuse or other disposal.

Figure 5:
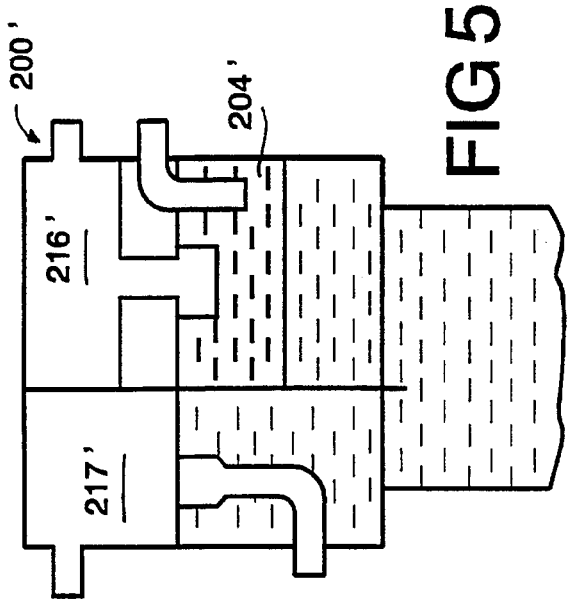
FIG. 5 is a modified form of the separator vessel of FIG. 2.

The apparatus illustrated in FIG. 5 is functionally identical to the separator 205 illustrated in FIG. 2 except that the upper housing 200' is divided by a vertical wall 208' which is offset substantially to one side of the center line of the structure, such that the first fluid chamber 216' is of substantially greater size than the second fluid chamber 217'. This allows for a relatively greater dwell time of the in-process liquid in the first fluid chamber 216' and provides for a relatively larger accumulated body of oil 204' before it becomes necessary or desirable to discharge oil to the oil-receiving vessel 405.

Figure 6:
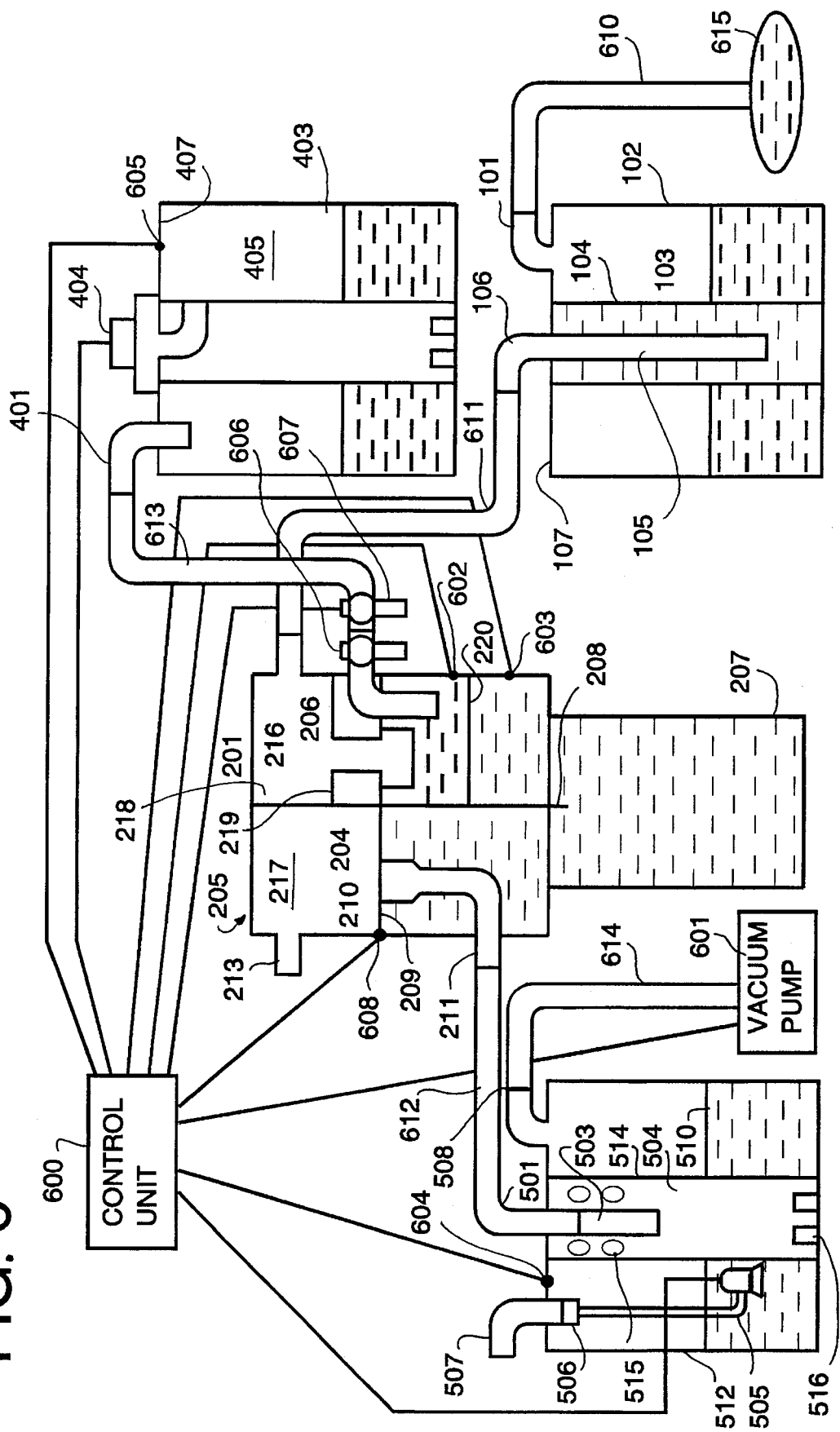
FIG. 6 is a simplified schematic diagram of the processing system of the invention, utilizing the processing vessels of FIGS. 1–4, for effecting automatic or semiautomatic clean up and processing of liquid waste materials.

A fully functioning and substantially automated system according to the invention is illustrated in FIG. 6, it being understood that the oil-receiving vessel 405 shown therein typically and desirably will be located at the same level as the waste water receiving vessel 103 and processed water vessel 205. A waste water pickup, including a flexible hose 610 is connected to the waste water inlet fitting 101. The strained waste water outlet 106 is connected via flexible hose 611 to the waste water inlet fitting 201 at the top of the first fluid chamber 216 of the separator vessel 205. The processed water outlet 211 from the second fluid chamber 217 is connected by way of a flexible hose 612 to the processed water inlet fitting 501 of the processed water vessel 504. The alternate suction fitting 213 of the separating vessel 205 is blocked in the illustrated system.

In the illustrated system, the oil inlet fitting 401 of the oil-receiving vessel 405 is connected by way of a flexible hose 613 and valves 607, 606 to the oil outlet fitting 206 leading from the first fluid chamber 216. Valve 606 is a check valve to prevent inflow of air or liquid into the fluid chamber 216, which is normally under reduced pressure. The valve 607 selectively connects to the atmosphere as a syphon break, desired when the system is shut down.

To initiate operation of the system of FIG. 6, the separating vessel 205 is initially pre-filled with clean water. This can be accomplished by starting the vacuum pump 601, which is connected to the processed water vessel 504 by a flexible hose 614, and places the vessel 504, the fluid chambers 216, 217, and the vessel 103 under reduced pressure. The suction hose 610 can then be placed in a body of clean water to fill the separating vessel 205, or the latter can be filled independently, as desired. When the level of clean water in the system is at its normal level 209, as determined by the level of the processed water outlet opening 210, the waste water suction hose 610 may be placed in a body of waste water, schematically indicated at 615 in FIG. 6.

By way of suction from the vacuum pump 601, waste water, including possible dirt, debris and other matter is drawn up through the waste water hose 610 and discharged into the interior of the waste water vessel 103. The apertured tube 104 serves as a fine sieve or strainer, holding back most of the solid material and permitting oily watery mixture to flow through the outlet pipe 105.

The strained, oily mixture flows through the flexible hose 611 and is discharged into the upper portions of the first fluid chamber 216 under the action of the vacuum pump 601. Once in the upper portion of the chamber 216, however, the mixture flows onto the baffle 219 and from there flows gently and purely by gravity downward through the Tee fitting 203 and into the body of liquid retained in the fluid chamber 216. From the chamber 216, there is a gentle, quiescent flow of liquid in a generally downward direction, around the lower extremity of the dividing wall 208. During this quiescent downward flow, the oily components separate into a layer 204, which remains at the top. Also, during the dwell time in the chamber 216 and the receptacle 207, some additional fine solids may precipitate out of the water and drop to the bottom of the receptacle.

Relatively clean water, free of its oily components, flows gently upward in the second fluid chamber 217 and is constantly drawn off through the opening 210 of the outlet fitting 211, from which it flows into the discharge pipe 503 and ultimately into the water receiving vessel 504.

Although it is quite easy to operate the system entirely manually, it is advantageous to employ a control unit 600, which will provide a substantial degree of automatic functioning. In the system illustrated in FIG. 6, a first oil interface sensor 602 is provided in the fluid chamber 216, to sense when the accumulating body of oil 204 reaches a predetermined level in the fluid chamber. When the sensor 602 detects oil, it actuates a solenoid valve 607, closing the syphon break vent to the atmosphere, and it simultaneously actuates the vacuum pump 404 mounted on the lid on the oil-receiving vessel 205. The vacuum pump 404 is designed to provide a slightly greater suction than the vacuum pump 601, such that oil from the layer 204 is drawn through the hose 613 and discharged into the vessel 405. As oil is withdrawn from the layer 204, the oil-water interface 220 will rise, eventually deactuating the sensor 602, reopening the solenoid valve 607 and deactivating the vacuum pump 404.

As long as the system functions normally, the sensor 602 will go through a periodic cycle of operations to extract oil from the accumulating layer 204. Independently, as the level of processed water in the vessel 504 rises to the predetermined level 510, the discharge pump 505 will periodically cycle on and off to discharge accumulating water from that vessel.

In due course, the oil- receiving vessel 405 will become filled, activating a sensor 605 mounted on the lid 407 of that vessel. This immediately renders the oil sensor 602 inoperative, so that no further oil may be extracted from the separating vessel 205. If desired, a visual or audible alarm or other signal may accompany actuation of the sensor 605 to alert the operator.

If no action is taken by the operator after the sensor 605 indicates a filled condition of the oil-receiving vessel 405, the oil layer 204 will continue to increase in depth, until it reaches a second oil sensor 603, located in a lower portion of the fluid chamber 216. When this occurs, the control unit 600 functions to deactivate the vacuum pump 601, so that no further waste water processing can be carried out until the oil-receiving vessel 405 has been emptied.

In the event of malfunction in the processed water discharge pump 505, the water level in the vessel 504 would continue to rise until the vessel 504 was full. At this time, a sensor 604, mounted on the lid of the vessel, will detect the excessive height of the contained water and immediately deactivate the vacuum pump 601 until the condition is remedied.

Desirably, a sensor 608 is also provided in the second fluid chamber 217, to confirm that the level of water in the processing vessel 205 is up to the "normal" level determined by the processed water outlet 210.

At the end of a clean up operation (and also periodically in the course of such operation if necessary) the waste water receiving vessel 103 should be emptied of its contents. Where the residual solid content of the vessel 103 represents hazardous material, it may be most appropriate simply to remove the custom lid 107 and replace it with a conventional lid and seal the vessel closed for subsequent disposal. A new standard container can be substituted for the original receptacle. The same is true for the oil-receiving vessel 405. Typically, the oil content thereof can be reprocessed and reused. However, should it represent a hazardous material, the receptacle 403 can be removed and sealed.

Figure 7:
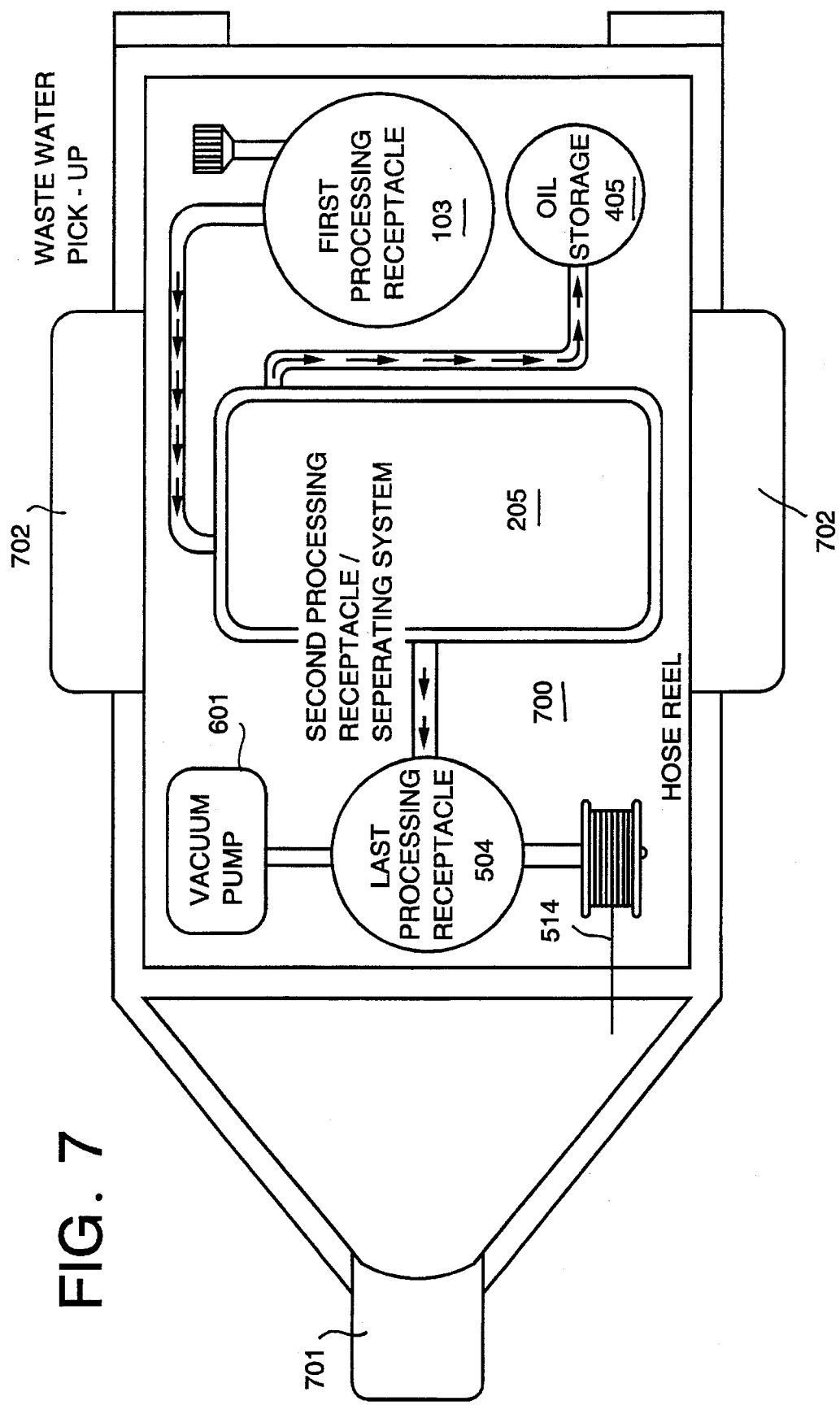
FIG. 7 is a simplified top plan view of a typical mobile trailer setup for the processing system of FIG. 6.

To particular advantage, the system of FIG. 6 may be easily mounted on a simple towing trailer, to be driven to the clean up site by a small truck or van, for example. Such a trailer, as shown in FIG. 7, may comprise a simple flatbed or low sided trailer 700 with a suitable towing hitch 701. Desirably, the separating vessel 205, constituting the largest and heaviest component of the system, is mounted generally over the wheels 702. The oil-receiving vessel 405 and the waste water receiving vessel 103 advantageously are mounted at the back of the trailer for easiest access for emptying and/or replacement. The processed water vessel 504 and the main vacuum pump 601 advantageously are located in the front portion of the trailer. The processed water vessel 504 may have a hose 514 for directing the discharge of processed water from the outlet fitting 507.

As will be apparent from the foregoing, the system of the invention, although capable of being assembled from relatively inexpensive, largely readily available components, is uniquely effective for cleaning up and processing waste water at a cleaning site. A complete system according to the invention is compact, lightweight and may be easily taken to the clean up site by trailer pulled with a small vehicle.

Of particular significance, the processing of the waste water is carried out at the clean up site, and not at some remote processing installation. Multiple important advantages are derived from that fact. Among the more important advantages are that it is unnecessary to either transport or, having transported, become responsible for hazardous waste materials. If hazardous waste materials exist at the clean up site, they can remain at that site. Transportation of the materials is avoided altogether and the responsibility for proper storage and/or disposal remains with the party that created the waste. Nevertheless, even for the party who retains responsibility for the waste, the amount thereof is greatly reduced by the on-site separation of the water fraction and the facile containerization of the hazardous materials.

A particularly significant component of the new system is the separating vessel 205, which comprises first and second fluid chambers, which communicate at their upper and lower extremities and which perform efficient fluid separation. Incoming waste water is discharged into an upper portion of the first chamber and caused to flow gently downward by gravity into a quiescent body of oily liquid separated from and supported by an underlying body of water. Because of the gentle, quiescent flow of incoming liquid, separating efficiency is enhanced. As the separated oily layer increases in depth, it is periodically transferred from the layer 204 into the oil-receiving vessel 405. An important advantage of the disclosed separating vessel is its ability to handle and process spills of 100% oily materials. With the system of the invention, flows of purely oily liquids entering the separator vessel 205 are retained by floatation in the first fluid chamber 216 and simply accumulate until the sensor 602 is activated to effect a pump-out to the oil-receiving vessel 405. It is not necessary for any water to be flowing into the separator vessel along with the oil for the system to function in its intended manner.

In addition to its many functional advantages, the exceptional simplicity and efficiency of the separating vessel 205 greatly facilitates the ability to provide a low cost, simplified, yet industrially effective transportable system for on-site clean up of waste liquids.

The waste-water receiving vessel 103 also represents an important improvement, in that it greatly facilitates the handling of solids and trash that quite typically accompany the clean up of spilled liquids. The picked up solids are accumulated within the vessel 103 and can periodically (or at the end of the clean up operation) be conveniently disposed of. If the collected solid material is of hazardous character, it can be containerized on the site. By constructing the vessel with its inlet and outlet fittings, and an elongated, structural strainer tube all mounted on the removable lid of the vessel, it is possible and convenient to substitute containers, whenever desires.

It should be understood, of course, that the specific forms of the invention herein illustrated and described are intended to be representative only, as certain changes may be made therein without departing from the clear teachings of the disclosure. By way of example, instead of employing a vacuum pump 601 at the upstream end of the system, fluid may be pumped through the system or in some cases caused to flow by gravity. While vacuum is a most convenient technique, it is only one means of providing a pressure differential to achieve a flow of fluid from one end of the system to the other. Accordingly, reference should be made to the following appended claims in determining the full scope of the invention.

I claim:

1. A separating and disposal system for handling watery, oily waste, which comprises,
   (a) a closed fluid-separating vessel,
   (b) a generally vertically disposed dividing wall in said vessel extending downwardly from upper portions of said vessel and defining first and second fluid chambers therein,
   (c) said fluid chambers having upper portions located in upper portions of said vessel and lower portions in fluid communication with each other, (d) a fluid inlet means for flowing fluid into the upper portions of said first fluid chamber and a fluid outlet communicating with the upper portions of said second fluid chamber enabling fluid flow through said vessel, from said first fluid chamber to said second fluid chamber, via the communicating lower portions of said fluid chambers, (e) said fluid outlet being located at a predetermined height in the upper portions of said second fluid chamber and establishing a predetermined normal liquid level for said second fluid chamber, (f) air passage means connecting said first and second fluid chambers above said normal liquid level for maintaining the normal liquid level in said first fluid chamber substantially equal to the level in said second fluid chamber, (f) means for controllably effecting a flow of fluid into said first fluid chamber and out of said second fluid chamber while providing a dwell period in said first fluid chamber to enable separation and flotation of oily liquid from a mixture of oily and watery waste, (g) a sensing device in said first fluid chamber, located below said normal liquid level and above said lower portions, for sensing a layer of oily liquid separated from and supported by water, (h) a discharge conduit for oily liquid communicating with said first fluid chamber below said normal liquid level and above the level of said sensing device, and (i) flow control means operative when said sensing device senses a predetermined layer of oily liquid in said first fluid chamber to effect the controlled and selective discharge flow of said oily liquid from said first fluid chamber.

2. A separating and disposal system according to claim 1, further characterized by (a) said fluid inlet means communicating with said first fluid chamber above said normal liquid level, and comprising (b) flow baffle means in said first fluid chamber above said normal liquid level providing a relatively quiescent flow of waste liquid into a body of liquid retained in said first fluid chamber.

3. A separating and disposal system according to claim 2, further characterized by (a) said flow baffle means including a generally horizontal baffle plate dividing the upper portions of said first fluid chamber above said normal liquid level, and (b) gravity flow passage means for flowing said waste liquid from said baffle plate to a level not substantially above said normal liquid level.

4. A separating and disposal system according to claim 3, further characterized by (a) said air passage means connecting said first and second fluid chambers above said baffle plate.

5. A separating and disposal system for handling watery, oily waste, which comprises (a) first and second fluid chambers disposed generally in a side-by-side arrangement, (b) means forming a fluid flow connection between lower portions of said fluid chambers, (c) means forming an air flow connection between upper portions of said fluid chambers, (d) a fluid inlet means for flowing fluid into the upper portions of said first fluid chamber, (e) a fluid outlet communicating with said second fluid chamber and being located at a predetermined height therein to establish a predetermined normal liquid level for said first and second chambers, (f) means in said first fluid chamber for sensing the level of an interface between a layer of oily liquid separated from and supported by water, (g) a discharge conduit for oily liquid communicating with said first fluid chamber below said normal liquid level for effecting removal of oily liquid from said first fluid chamber, (h) means for effecting a flow of liquid into said fluid inlet means and out of said fluid outlet, and (i) control means responsive to said means for sensing for periodically and selectively removing oily liquid from said first fluid chamber.

6. A separating and disposal system according to claim 5, further characterized by (a) said means for sensing the level of said layer of oily liquid comprising a sensor in said first fluid chamber operative to detect an oil-water interface.

7. A separating and disposal system according to claim 6, further characterized by (a) a normally closed oil-receiving vessel, connected to said discharge conduit, for receiving oily liquid from said first fluid chamber, (b) said oil-receiving vessel including sensor means for determining a full condition.

8. A separating and disposal system according to claim 5, further characterized by (a) said first fluid chamber having a horizontal baffle therein positioned above said normal liquid level and below the level of said fluid inlet means, whereby waste liquid enters said first fluid chamber above said horizontal baffle, and further comprising (b) flow passage means for effecting quiescent flow of said waste liquid from above said baffle to a level at or below said normal liquid level.

9. A separating and disposal system for handling watery, oily waste, which comprises, (a) a closed fluid-separating vessel, (b) a generally vertically disposed dividing wall in said vessel extending downwardly from upper portions of said vessel and defining first and second fluid chambers therein, (c) said fluid chambers having upper portions located in upper portions of said vessel and lower portions in fluid communication with each other, (d) a fluid inlet means for flowing fluid into the upper portions of said first fluid chamber and a fluid outlet communicating with the upper portions of said second fluid chamber enabling fluid flow through said vessel, from said first fluid chamber to said second fluid chamber, via the communicating lower portions of said fluid chambers, (e) said fluid outlet being located at a predetermined height in the upper portion of said second fluid chamber and establishing a predetermined normal liquid level for said second fluid chamber, (f) air passage means connecting said first and second fluid chambers above said normal liquid level for maintaining the normal liquid level in said first fluid chamber substantially equal to the level in said second fluid chamber, (g) means for controllably affecting a flow of fluid into said first fluid chamber and out of said second fluid chamber while providing a dwell period in said first fluid chamber to enable separation and flotation of oily liquid from a mixture of oily and watery waste, (h) a sensing device in said first fluid chamber, located below said normal liquid level and above said lower portions, for sensing a layer of oily liquid separated from and supported by water, (i) a discharge conduit for oily liquid communicating with said first fluid chamber below said normal liquid level and above the level or said sensing device, and (j) flow control means operative when said sensing device senses a predetermined layer of oily liquid in said first fluid chamber to effect the controlled and selective discharge flow of said oily liquid from said first fluid chamber, (k) said closed fluid-separating vessel comprising a chamber-forming housing, open at the bottom, and an open-topped supporting receptacle, (l) said housing being mounted on said open-topped receptacle in communication therewith, (m) said dividing wall having lower portions extending downwardly below chamber-forming portions of said housing and projecting into upper portions of said supporting receptacle, (n) said first and second fluid chambers communicating with each other through said supporting receptacle and below the lower portions of said dividing wall.

10. A separating and disposal system for handling watery, oily waste, which comprises, (a) a closed fluid-separating vessel, (b) a generally vertically disposed dividing wall in said vessel extending downwardly from upper portions of said vessel and defining first and second fluid chambers therein, (c) said fluid chambers having upper portions located in the upper portions of said vessel and lower portions in fluid communication with each other, (d) a fluid inlet means for flowing fluid into the upper portions of said first fluid chamber and a fluid outlet communicating with the upper portions of said second fluid chamber enabling fluid flow through said vessel, from said first fluid chamber to said second fluid chamber, via the communicating lower portions of said fluid chambers, (e) said fluid outlet being located at a predetermined height in the upper portions of said second fluid chamber and establishing a predetermined normal liquid level for said second fluid chamber, (f) air passage means connecting said first and second fluid chambers above said normal liquid level for maintaining the normal liquid level in said first fluid chamber substantially equal to the level in said second fluid chamber, (g) means for controllably effecting a flow of fluid into said first fluid chamber and out of said second fluid chamber while providing a dwell period in said first fluid chamber to enable separation and flotation of oily liquid from a mixture of oily and watery waste, (h) a sensing device in said first fluid chamber, located below said normal liquid level and above said lower portions, for sensing a layer of oily liquid separated from and supported by water, (i) a discharge conduit for oily liquid communicating with said first fluid chamber below said normal liquid level and above the level of said sensing device, (j) flow control means operative when said sensing device senses a predetermined layer of oily liquid in said first fluid chamber to effect the controlled and selective discharge flow of said oily liquid from said first fluid chamber, (k) said fluid inlet means including a closed solids-separating vessel having an inlet and an outlet for waste liquid and further comprising a waste retrieving conduit connected to said waste liquid inlet through which waste liquids are caused to flow into said solids-separating vessel, (l) said solids-separating vessel having a tubular strainer therein extending vertically therein and providing structural support between top and bottom walls thereof, (m) the outlet of said solids-separating vessel comprising a conduit extending axially within said tubular strainer, from the top thereof to a level adjacent the bottom thereof, and (n) a conduit connecting said outlet of said separating vessel to the fluid inlet means communicating with the upper portions of said first fluid chamber.

11. A separating and disposal system according to claim 10, further characterized by (a) said means for controllably effecting a flow of fluid comprising a suction device communicating with the fluid outlet of said second fluid chamber.

12. A separating and disposal system according to claim 11, further characterized by (a) a closed holding vessel for processed water, (b) said holding vessel having an inlet and outlet for water, (c) a fluid conduit connecting said holding vessel inlet to the fluid outlet of the second fluid chamber of said fluid-separating vessel, and (d) said suction device being connected to upper portions of said holding vessel.

13. A separating and disposal system according to claim 12, further characterized by (a) a pump connected to said holding vessel and operative periodically to remove processed water therefrom against the action of said suction device.

14. A separating and disposal system for handling watery, oily waste, which comprises (a) first and second fluid chambers disposed generally in a side-by-side arrangement, (b) means forming a fluid flow connection between lower portions of said fluid chambers, (c) means forming an air flow connection between upper portions of said fluid chambers, (d) a fluid inlet means for flowing fluid into the upper portions of said first fluid chamber, (e) a fluid outlet communicating with said second fluid chamber and being located at a predetermined height therein to establish a predetermined normal liquid level for said first and second chambers, (f) means in said first fluid chamber for sensing the level of an interface between water and a layer of oily liquid separated from and supported by water, (g) a discharge conduit for oily liquid communicating with said first fluid chamber below said normal liquid level for effecting removal of oily liquid from said first fluid chamber, (h) means for effecting a flow of liquid into said fluid inlet means and out of said fluid outlet, and (i) said means for effecting a flow of liquid comprising a vacuum source communicating with said fluid outlet.

15. A separating and disposal system for handling watery, oily waste, which comprises
  (a) first and second fluid chambers disposed generally in a side-by-side arrangement,
  (b) means forming a fluid flow connection between lower portions of said fluid chambers,
  (c) means forming an air flow connection between upper portions of said fluid chambers,
  (d) a fluid inlet means for flowing fluid into the upper portions of said first fluid chamber,
  (e) a fluid outlet communicating with said second fluid chamber and being located at a predetermined height therein to establish a predetermined normal liquid level for said first and second chambers,
  (f) means in said first fluid chamber for sensing the level of an interface between water and a layer of oily liquid separated from and supported by water,
  (g) a discharge conduit for oily liquid communicating with said first fluid chamber below said normal liquid level for effecting removal of oily liquid from said first fluid chamber, and
  (h) means for effecting a flow of liquid into said fluid inlet and out of said fluid outlet,
  (i) said fluid inlet means including a normally closed waste-receiving vessel, an inlet conduit connected to said waste-receiving vessel for drawing oily-watery waste liquid into said vessel, an outlet conduit connected between said waste-receiving vessel and said first fluid chamber, and a strainer in said waste-receiving vessel for retaining solid materials entering said vessel from said inlet conduit.

16. A separating and disposal system according to claim 15, further characterized by
  (a) said waste-receiving vessel comprising an inlet conduit, an outlet conduit and a lower receptacle portion and a removable top,
  (b) said strainer comprising an elongated tubular member mounted on said removable top and extending downwardly substantially to the bottom of said receptacle portion to provide vertical support for said removable top,
  (c) said outlet conduit being connected to said removable top and extending downwardly within said tubular strainer member,
  (d) said inlet conduit being connected to said removable top,
  (e) said inlet and outlet conduits and said tubular strainer being fixed to and removable with said removable top.

17. A separating and disposal system for handling watery, oily waste, which comprises
  (a) first and second fluid chambers disposed generally in a side-by-side arrangement,
  (b) means forming a fluid flow connection between lower portions of said fluid chambers,
  (c) means forming an air flow connection between upper portions of said fluid chambers,
  (d) a fluid inlet means for flowing fluid into the upper portions of said first fluid chamber,
  (e) a fluid outlet communicating with said second fluid chamber and being located at a predetermined height therein to establish a predetermined normal liquid level for said first and second chambers,
  (f) means in said first fluid chamber for sensing the level of an interface between water and a layer of oily liquid separated from and supported by water,
  (g) a discharge conduit for oily liquid communicating with said first fluid chamber below said normal liquid level for effecting removal of oily liquid from said first fluid chamber, and
  (h) means for effecting a flow of liquid into said fluid inlet means and out of said fluid outlet,
  (i) said fluid outlet including a normally closed water-receiving vessel comprising a lower receptacle and a removable top, a vertical support member fixed to said removable top and extending substantially to the bottom of said receptacle, a discharge pump mounted on said support member and having a discharge tube extending through the removable top for removing water from said vessel, a suction source connected to said water-receiving vessel through the removable top thereof, and a check valve in said discharge tube for preventing backflow of water through said tube when said discharge pump is not operating.

18. A separating and disposal system for handling watery, oily waste, which comprises
  (a) first and second fluid chambers disposed generally in a side-by-side arrangement,
  (b) means forming a fluid flow connection between lower portions of said fluid chambers,
  (c) means forming an air flow connection between upper portion of said fluid chambers,
  (d) a fluid inlet means for flowing fluid into the upper portions of said first fluid chamber,
  (e) a fluid outlet communicating with said second fluid chamber and being located at a predetermined height therein to establish a predetermined normal liquid level for said first and second chambers,
  (f) means in said first fluid chamber for sensing the level of an interface between water and a layer of oily liquid separated from and supported by water,
  (g) a discharge conduit for oily liquid communicating with said first fluid chamber below said normal liquid level for effecting removal of oily liquid from said first fluid chamber,
  (h) means for effecting a flow of liquid into said fluid inlet means and out of said fluid outlet,
  (i) said first and second fluid chambers comprising separate portions of a chamber-forming housing,
  (j) said chamber-forming housing having a generally vertical dividing wall defining said first and second fluid chambers and further comprising,
  (k) an open-top receptacle,
  (l) means for mounting said chamber-forming housing on said open-top receptacle for closing and sealing said receptacle, and
  (m) the lower portions of said first and second fluid chambers communicating with said open-top receptacle.

19. A separating and disposal system according to claim 18, further characterized by
  (a) said dividing wall extending downward from said chamber-forming housing into said open-top receptacle,
  (b) said means forming a fluid flow connection between lower portions of said fluid chambers including a flow path in said open-top receptacle below lower portions of said dividing wall.

* * * * *